W. A. PRICE.
OPERATION OF ELECTRICAL MACHINES OF THE INDUCTION TYPE.
APPLICATION FILED NOV. 6, 1911.
1,116,116. Patented Nov. 3, 1914.
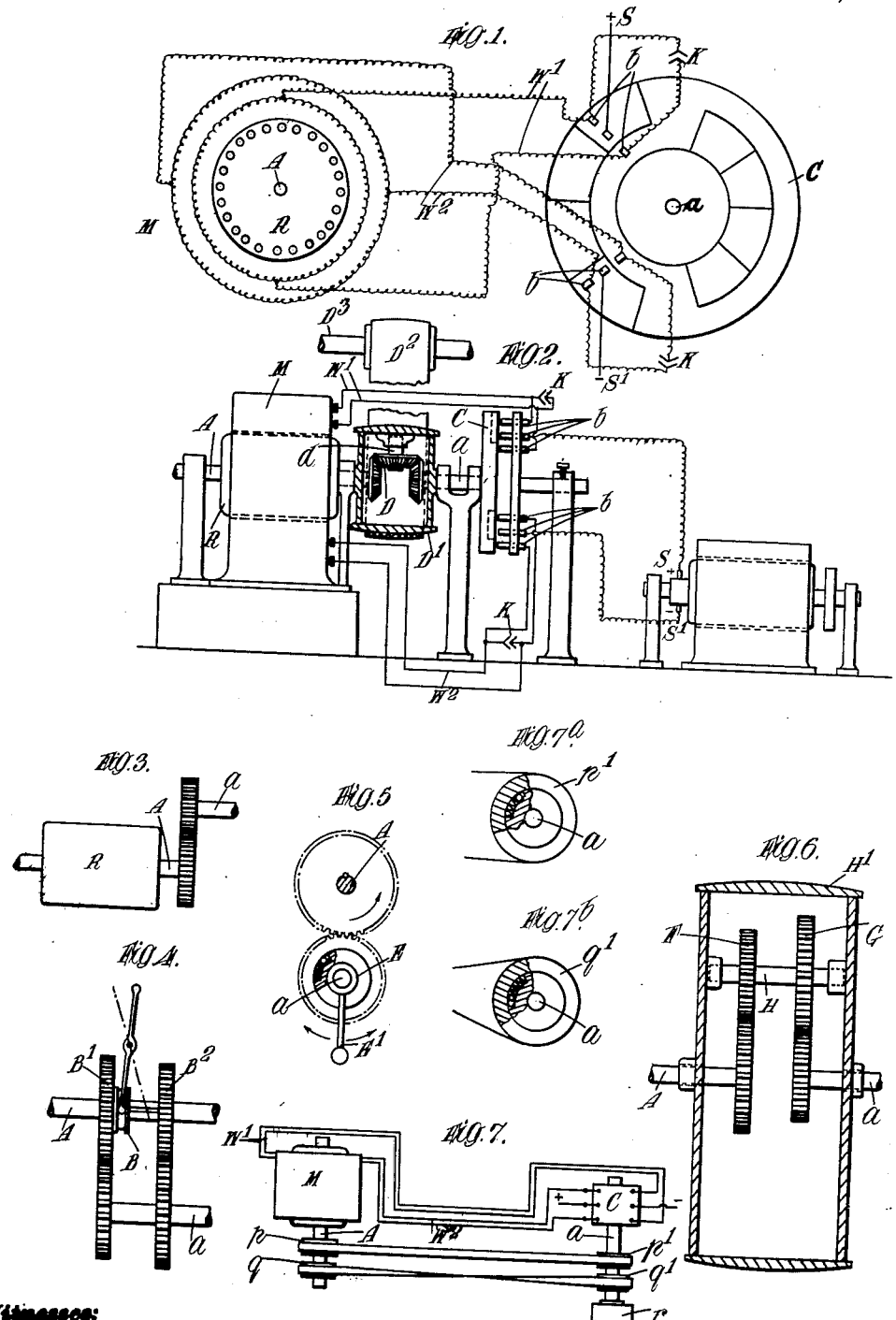

UNITED STATES PATENT OFFICE.

WILLIAM ARTHUR PRICE, OF NEWCASTLE-UPON-TYNE, ENGLAND.

OPERATION OF ELECTRICAL MACHINES OF THE INDUCTION TYPE.

1,116,116.  Specification of Letters Patent. Patented Nov. 3, 1914.

Application filed November 6, 1911. Serial No. 658,850.

*To all whom it may concern:*

Be it known that I, WILLIAM ARTHUR PRICE, a subject of the King of Great Britain, residing at 135 Sandyford road, in the city and county of Newcastle-upon-Tyne, England, have invented certain new and useful Improvements Relating to the Operation of Electrical Machines of the Induction Type, of which the following is a specification.

This invention relates to the operation of electrical machines of the induction type and has reference to the operation of induction motors by alternating currents taken through reversing commutators from a direct current supply, or of similar machines acting as generators and delivering direct current from reversing commutators to an external circuit.

In the operation of an ordinary induction motor taking power from an alternating source of supply the amount of power absorbed by the motor depends on several factors of which the principal are the pressure at the terminals, the frequency of the alternations, the resistance of the armature winding where that is variable, and the speed of the rotor. The frequency of alternation of an alternating current supply is usually fixed, but the pressure at the motor terminals can be varied by inserting inductances in series with the several field windings, and the resistance of the armature winding can be varied by external resistance connected across its slip rings. In one or both of these ways is the operation of such motors from an alternating current supply controlled. If, however, the same motor be operated by alternating currents derived through a reversing commutator from a direct current supply at fixed pressure, it is possible, in addition to the methods of control available in the case just mentioned, to vary the frequency of the alternations by varying the speed of the reversing commutator, and thus to make use of an extra way of controlling the power taken by the motor from a direct current source beyond those available when the source of power is an alternating current supply of fixed pressure and frequency.

The present invention relates to the operation of machines in which the extra control above referred to is available and it consists in providing mechanical or other equivalent connections between the rotor of the machine and the commutator so as to make them wholly or partly interdependent in motion, thereby causing the frequency of the alternations to depend upon the speed of the rotor.

Suppose an induction motor to have $2n$ poles on each winding, and that the currents have $m$ complete alternations per minute. Then $\frac{m}{n}$ is the number of revolutions per minute of the field in the motor, and may be called P. The number of revolutions per minute of the rotor may be called P'. Then the number P—P' is termed in this specification the slip of the rotor and may be called $p$.

The current taken by an ordinary induction motor under a fixed supply pressure is, for a limited though considerable range of speed, nearly inversely proportional to the frequency of alternation and hence also to the speed of the field, and nearly proportional to the slip of the rotor so long as this slip does not exceed some limit, which, in the case for example of a low resistance squirrel cage rotor, would not much exceed ten per cent. of the rotor speed. That is, the current taken is nearly proportional to $\frac{p}{P}$ or $1-\frac{P'}{P}$ within certain limits of the values of the quantities. Now P is proportional to $m$, the number of alternations per minute produced by the commutator, so that if the axle of the rotor be connected by gearing, belts, or other such means, to the moving parts of the commutator, some relations useful for controlling the currents in the motor may be maintained between P, P' and $p$.

In order that the invention may be clearly understood and readily carried into effect, I will now describe the same more fully with reference to the accompanying diagrammatic figures which illustrate several modes of connecting the axle of the rotor of an induction motor to a moving commutator to produce different results.

Figure 1 illustrates diagrammatically an induction motor and a commutator and the electrical connections between them. Fig. 2 is a side elevation of the motor, the commutator, gearing between the same, and a direct current generator. Figs. 3 to 7 illustrate different arrangements for controlling the transmission of power between the axles of the rotor and the commutator.

For the purpose of description the application of the invention will be considered with reference to a particular kind of motor operated by a rotary commutator in a particular way; but induction machines can be operated by commutators from a direct current supply in more than one way, and the invention is not limited to the particular type of machine and commutator described and illustrated.

In Figs. 1 and 2 a commutator C rotating about an axis $a$ under brushes $b$ $b$ to which are connected electrolytic condensers K, K, as shown, takes current from a constant pressure direct current supply, S, S', and delivers alternating currents in quadrature to the two windings $W'$ $W^2$ of a two-phase induction motor M with a squirrel cage rotor R. For the purpose of illustration I take the case of a motor where there are two poles to each winding, so that the field of the motor M makes the same number of revolutions per minute as does the commutator C, but the application of the method is evidently not limited to that case. The operation of a machine having more than two poles will require a commutator making reversals at a proportionally higher speed. Then if the axles A and $a$ are connected by gearing in such a way that their speeds differ by a constant amount, the current taken by the motor will be nearly inversely proportional to the speed over a considerable range, similarly to an ordinary direct current series-wound motor. This effect may for example be accomplished as shown in Fig. 2 where the wheel D runs freely on its spindle $d$ and can turn epicyclically about the common axis of the axles A $a$, by being mounted on the interior of a pulley $D^1$. Then the difference in the speeds of the axles A $a$ is twice the speed at which the spindle $d$ moves around the axis A $a$; the pulley $D^1$ may be driven by any ordinary independent source of power, such as by a belt connection $D^2$ with a power shaft $D^3$. If the pulley $D^1$ moves so that the axle $a$ moves faster than the axle A, the machine will act as a motor, taking current from the source of supply. If the pulley $D^1$ moves in the opposite direction about the axis A $a$ so that the axle A moves faster than the axle $a$, the rotor will be retarded instead of being accelerated, and the machine may act as a generator and return current to the source. The rotor R of the motor M is carried on an axle A. Again if the axles A $a$ are connected so that their speeds bear a constant ratio to one another, not largely distant from unity, the current taken from the supply will be nearly constant over a large range of speed if the speed of the rotor is less than the speed of the field. If, on the other hand, the speed of the rotor be greater than the speed of the field, the machine may return current to the source at a rate nearly independent of the speed over a considerable range.

In the form of gearing shown in Fig. 3, the axle A carries a wheel of one hundred teeth gearing with a wheel of ninety-five teeth on the axle $a$, so that the rotor of the motor M runs slower than the field by five per cent. at all speeds, and consequently takes a nearly constant curren over a large range of speed. If the wheels were interchanged on their axles, so that the rotor ran quicker than the field by five per cent. at all speeds, the rotor would be retarded instead of being accelerated, and, under proper conditions, the machine would generate current and return it to the source at a rate nearly independent of the speed over a considerable range.

Fig. 4 illustrates a clutch B mounted between two gear wheels $B'$ and $B^2$ of one hundred teeth and ninety-five teeth respectively gearing with wheels of ninety-five teeth and one hundred teeth respectively; by axially adjusting the clutch B to engage with the wheel $B'$ or the wheel $B^2$ the rotor can be accelerated or retarded as desired.

In the case in which the axles A $a$ are such that their speeds are always in the same proportion, as for example by the gearing shown in Fig. 3, then clearly, in order to start the motor M, means must be provided to give motion to the commutator C independently of the rotor R and its axle A. Fig. 5 illustrates one mode of attaining this end. Here the gear wheel on the axle $a$ instead of being mounted directly thereon has a free-wheel type of mounting E, thereby allowing the axle $a$ to be turned by a crank handle $E'$ without necessitating a turning of the axle A. As soon as the rotor has started, it of course drives the wheel on the axle A and hence causes the wheel on the axle $a$ to be driven; the handle $E'$ may then be released since the power from the axle A will continue the motion of the commutator. Another arrangement for obtaining a similar result is shown in Fig. 6 where two gear wheels F, G, of different diameters fixed on one axle H, are adapted to be revolved epicyclically about the axis of the axles A, $a$ by being mounted on the interior of an independently rotatable pulley $H'$. In this way the axle $a$ can be turned and the main motor M started by the wheels F, G. Then having started the motor M so that the axle A revolves, the independent source of power can be shut off. Or if it continues to supply power the speed of the axle $a$ will be the sum of some multiple of the speed of the axle A and of some multiple of the speed of the pulley $H'$. Again suppose it is desired to operate the motor M over a considerable range of speed by changing the speed of the commutator C, the latter being driven by an independent auxiliary motor of variable speed. Then it is necessary that the speed of the commutator C should not at any time be widely different from that of the motor M, since otherwise the rotor will fall out of step with the field.

Fig. 7 shows how the axles A a may be connected so that the commutator C can be accelerated or retarded without being allowed to differ in speed from the rotor by more than a fixed amount. The axles A a are geared together by straight and crossed belts running over two pairs of pulleys $p$ $p'$ and $q$ $q'$ respectively. The pulley $p'$ is 10 per cent. smaller than the pulley $p$, and the pulley $q'$ is ten per cent. larger than the pulley $q$. The pulley $p'$ is able to free wheel in one direction as shown for example in Fig. 7$^a$ and the pulley $q'$ in the opposite direction as shown for example in Fig. 7$^b$. $r$ is the independent auxiliary motor for driving the axle $a$ on which the pulleys $p'$, $q'$ are mounted. With this arrangement the axle $a$ can run freely and independently of the motion of the axle A so long as its speed is within ten per cent. of that of the axle A above or below but otherwise the speeds of rotation of the axles $a$ and A are interdependent. Thus the speed of the commutator C can be accelerated or retarded, and so consequently the speed of the motor M, but the speed of the commutator cannot be altered so rapidly as to throw the motor M out of step.

What I claim and desire to secure by Letters Patent of the United States is:—

1. The combination with an electrical machine of the induction type, direct current mains connected therewith, and a reversing commutator interposed in the electrical connections between the electrical machine and the mains, of means whereby the motion of the moving member of the commutator is made to depend upon but maintain asynchronism with respect to the speed of rotation of the rotary member of the electrical machine, for the purpose specified.

2. The combination with an electrical machine of the induction type, direct current mains connected therewith, and a reversing commutator interposed in the electrical connections between the electrical machine and the mains, of mechanical gearing whereby the rotary motions of the rotary members of the electrical machine and the commutator are made to depend upon one another but run asynchronously.

3. The combination with an electrical machine of the induction type, direct current mains connected therewith, and a reversing commutator interposed in the electrical connections between the electrical machine and the mains, of gearing connecting the moving members of the electrical machine and the commutator, and independently controllable means for affecting the motion transmitted by the gearing.

4. The combination with an electrical induction motor, direct current mains connected therewith, and a reversing commutator interposed between the motor and the mains, of means whereby the speed of the moving member of the commutator and the speed of rotation of the rotor of the motor are made to depend upon one another but run asynchronously.

5. The combination with an electrical induction motor, direct current mains connected therewith, and a reversing commutator interposed between the motor and the mains, of gearing whereby the rotary motions of the rotor of the motor and the rotary member of the commutator are made to depend upon one another but run asynchronously.

6. The combination with an electrical induction motor, direct current mains connected therewith, and a reversing commutator interposed between the motor and the mains, of independently regulatable gearing connecting the rotor of the motor with the rotary member of the commutator.

In testimony whereof I affix my signature in presence of two witnesses.

WILLIAM ARTHUR PRICE.

Witnesses:
  WILLIAM OWEN,
  JOHN JOHNSON.